Nov. 12, 1968   J. H. GUNDRUM ET AL   3,410,402
GLASSWARE INSPECTION DEVICE
Filed May 26, 1966   5 Sheets-Sheet 3

INVENTORS
JOHN H. GUNDRUM
VICTOR B. HENSEL
BY
Sughrue, Rothwell, Mion, Zinn & Macpeak
ATTORNEYS Nov. 12, 1968  J. H. GUNDRUM ET AL  3,410,402
GLASSWARE INSPECTION DEVICE
Filed May 26, 1966  5 Sheets-Sheet 4

INVENTORS
JOHN H. GUNDRUM
VICTOR B. HENSEL
BY
Sughrue, Rothwell, Mion, Zinn & Macpeak
ATTORNEYS

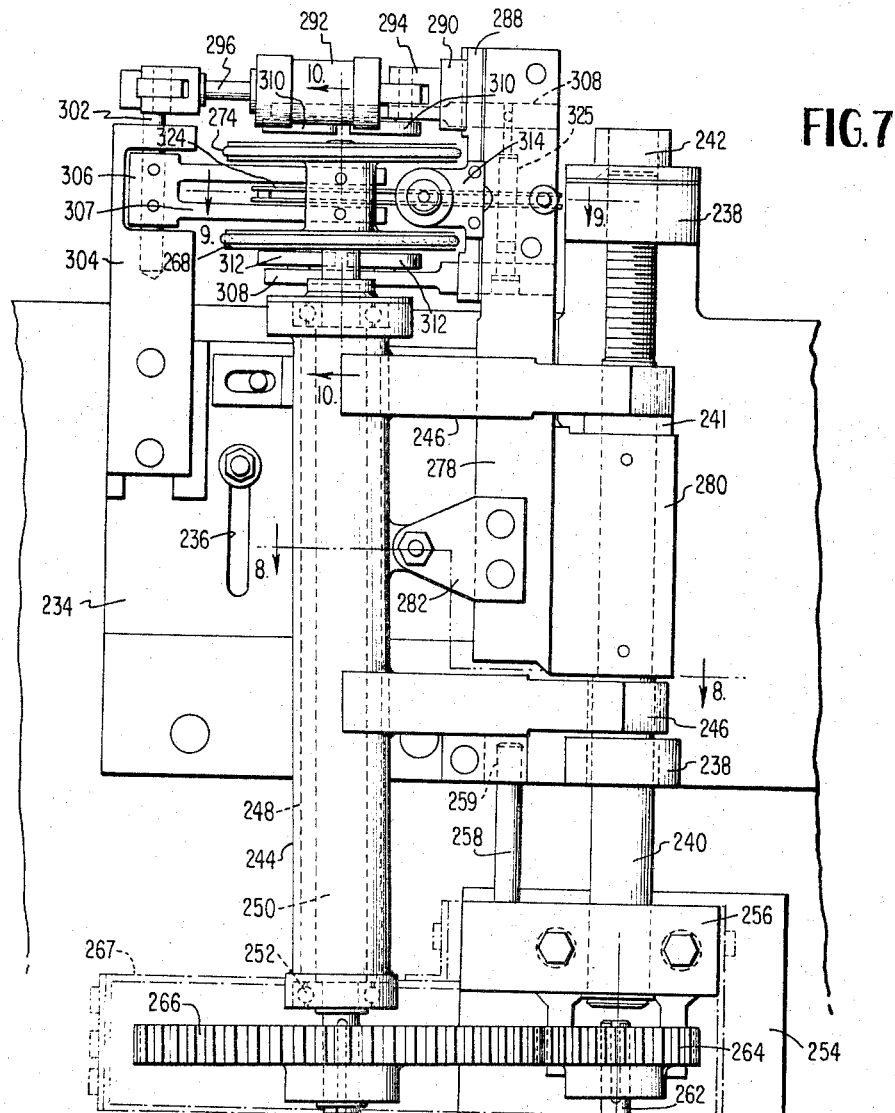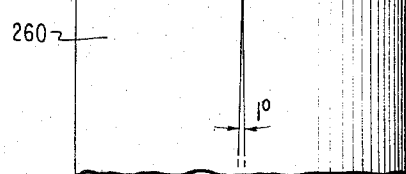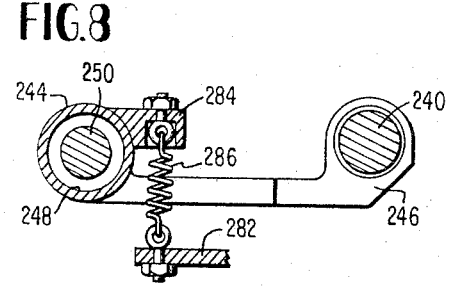

United States Patent Office 3,410,402
Patented Nov. 12, 1968

3,410,402
GLASSWARE INSPECTION DEVICE
John H. Gundrum, Lampeter, and Victor B. Hensel,
Lititz, Pa., assignors to Armstrong Cork Company,
Lancaster, Pa., a corporation of Pennsylvania
Filed May 26, 1966, Ser. No. 553,137
7 Claims. (Cl. 209—73)

ABSTRACT OF THE DISCLOSURE

A conveying, inspection and sorting arrangement utilizing a plurality of endless conveyer belts adjacent to and parallel the main conveyer belt wherein guide means are provided for transferring articles traveling on said main conveyer belt to said auxiliary conveyer belt for testing and sorting. Articles passing inspection are subsequently diverted back to said main conveyer belt whereas articles not passing inspection are allowed to continue along one of said auxiliary conveyer belts to a reject station. The inspection apparatus is adapted to be mounted along one of the auxiliary conveyer belts and is comprised of means for gripping and rotating the article for inspection and braking or stopping rotation of the article upon release of the article.

---

The present invention is directed to machinery or apparatus for the automatic handling and inspection of glass containers and other substantially cylindrical articles for dimensional defects, such as "off-tolerance" radial dimensions, "out-of-round" or ovality, peripheral "flat spots" and appreciable size surface pits, indentations or ruptures.

The apparatus described herein would consist of one or more automatic ware handling and inspection heads or devices mounted on conveyer mount assemblies specially constructed to permit easy attachment to industrial single line ware handling type conveyers.

The apparatus of the present invention describes a conveyer system capable of moving glassware in parallel rows of an inspection apparatus. The glassware in each row is confined to move in single file relationship. Each of the parallel rows of the inspection apparatus are provided with release gate means whereby one item of glassware at a time will be conveyed to an inspection head or device.

The inspection heads or devices of the present invention are comprised of a plurality of ware building components which may be pneumatically or hydraulically actuated by solenoid valves which in turn are energized and controlled by suitably located photocell means. The inspection head is provided with means for automatically rotating the glassware about its own axis at a fixed station while a plurality of sensing means utilizing differential transformers inspect the article of glassware for dimensional defects such as listed above. Upon leaving the inspection head the item of glassware is automatically diverted in accordance with the inspection results to either a rejection station or to a conveyer means which will transport the acceptable glassware to another processing or packing station.

Other features of the invention will be pointed out in the following description and claims and illustrated in the accompanying drawings, which disclose, by way of example, the principles of the invention and the best mode which has been contemplated of applying those principles.

In the drawings:

FIGURE 7 is a side elevational view of the inspection station as viewed along the line 7—7 in FIGURE 5;

FIGURE 8 is a partial sectional view taken along the line 8—8 in FIGURE 7;

FIGURE 9 is a partial sectional view taken along the line 9—9 in FIGURE 7; and

FIGURE 10 is a partial sectional view taken along the line 10—10 in FIGURE 7.

The present invention relates to an inspection device for containers comprising a main conveyer means, auxiliary conveyer means mounted adjacent said main conveyer means, gate means adjacent said auxiliary conveyer means adapted to release said containers, one at a time, in properly spaced relation, pressure means adjacent said auxiliary conveyer means adapted to rotatably grip said containers, one at a time, drive means for rotating said containers about their own axis while held by said pressure means, sensing means operable in conjunction with said pressure means and said drive means to sense various dimensional characteristics of said container, and additional gate means responsive to said sensing means to guide said containers in accordance with signals received from said sensing means, either off the auxiliary conveyer means or along said auxiliary conveyer means back to said main conveyer means.

Figure 1:
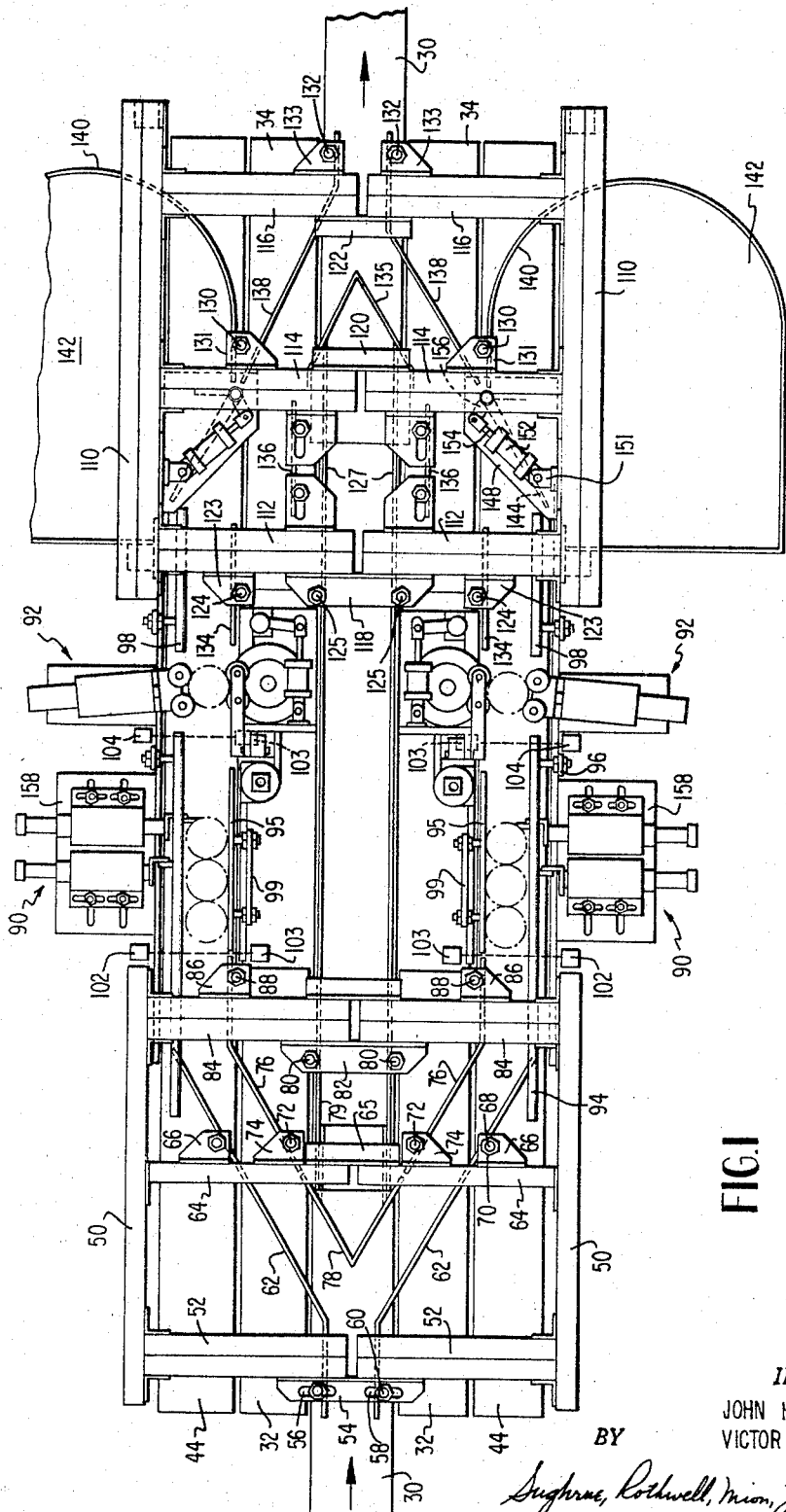
FIGURE 1 is a top plan view of the glassware inspection device.
Figure 2:
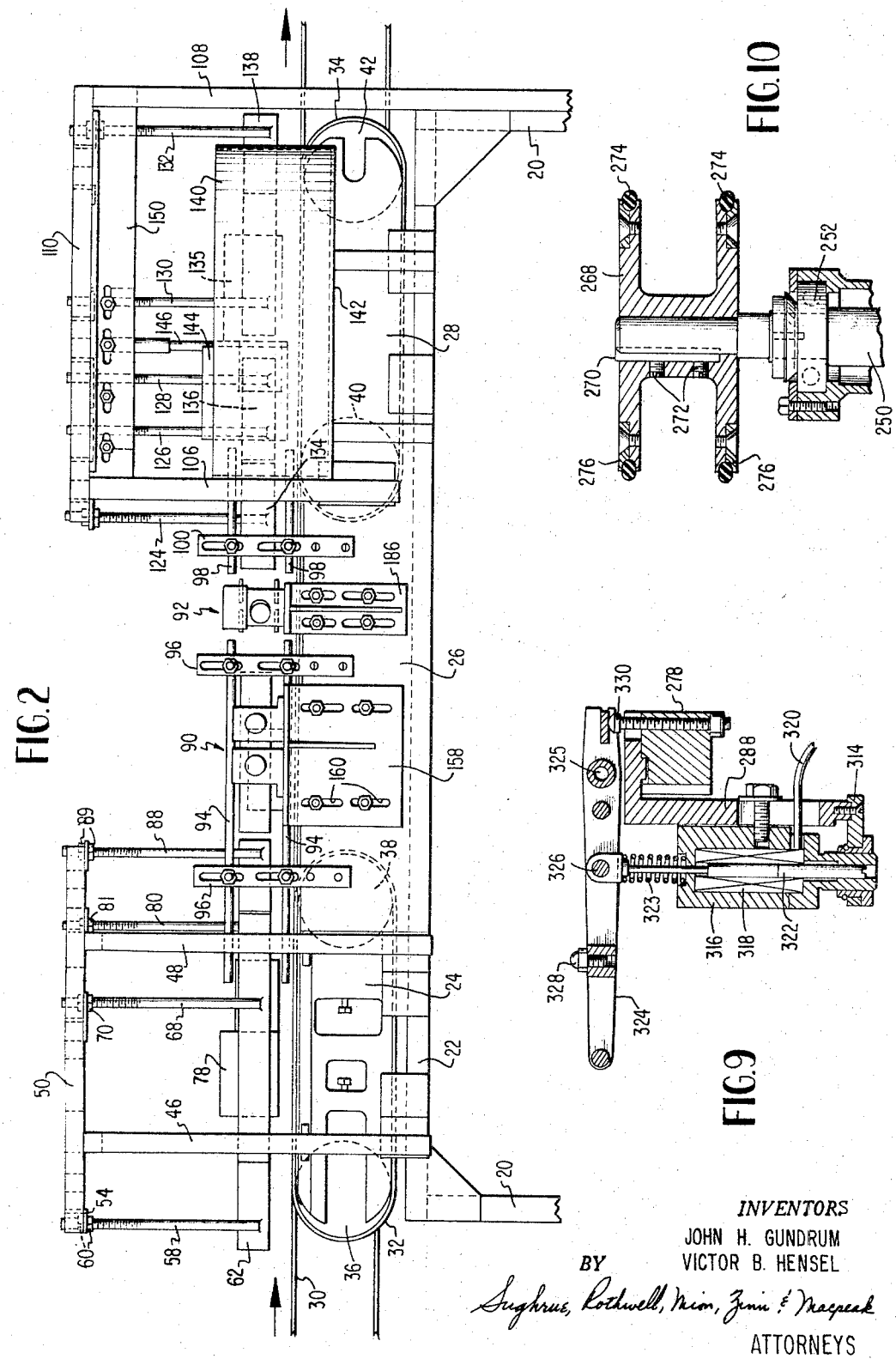
FIGURE 2 is a side elevational view of the glassware inspection device as shown in FIGURE 1.

Turning now to FIGURES 1 and 2 which show the inspection apparatus arranged in conjunction with a conveyer means, the numeral 20 designates the legs which maintain the main support frame 22 at the desired height. The portions of the inspection apparatus on each side of the main conveyer 30 are of substantially identical construction differing only in that one set of the apparatus is of the opposite hand from the other set of apparatus. Therefore, the apparatus will be described only with respect to that portion of the apparatus which is disposed on one side of the conveyer 30. The reference numerals used to describe the apparatus on one side will also be used to designate the corresponding apparatus on the opposite side of the conveyer.

Secured to the main support frame are a plurality of side plates 24, 26 and 28 on which a plurality of rollers 36, 38, 40 and 42 are rotatably journaled. A relatively short belt 32 is mounted about the rollers 36 and 38 at the input end of the apparatus and a second relatively short belt 34 is journaled about the rollers 40 and 42 at the output end of the apparatus. A longer conveyer belt 44 is mounted about the rollers 36 and 42. The drive for the rollers and belts may be a separate motor or the drive may be taken from the main conveyer belt 30, but in either case the speed of the belts 32, 44 and 34 should be the same as the speed of the belt 30.

Secured to the main support frame 22 and the side plate 24 at the input end of the inspection apparatus are pairs of uprights 46 and 48. A pair of stringer bars 50 are secured to the uppermost ends of the uprights and extend parallel to the direction of the conveyer belts. A pair of crossbars 52 are secured to the stringer bars 50 at one end thereof and extend towards each other and are secured together by an angle bracket 54 having a pair of elongated slots 56 disposed in the horizontal portion thereof. A plurality of rods 58 depend downwardly through the slots 56 and are adjustably secured to the bracket 54 by means of nuts 60 threaded on the upper ends thereof. The lower ends of the rods 58 are secured to guide the rails 62 by welding or any other suitable means. The guide rails 62 extend parallel to each other for a short distance and the spacing between the parallel portions of the guide rails 62 may be suitably adjusted by means of the slots 56 to accommodate various sized containers. The rails 62 then diverge from each other extending across the auxiliary conveyer belts 32 and 44.

A second pair of crossbars 64 are secured to the stringer bars 50 and extend towards each other and are secured by means of angle bracket 65. A pair of angle bracket supports 66 are secured to the crossbars 64 over the conveyer belts 44. A pair of rods 68 depend from the bracket 66 and are adjustably secured thereto by means of nuts 70 threaded on the uppermost ends of the rods 68. The lower ends of the rods 68 are secured to the diverging end portions of the guide rails 62 by welding or other suitable means. A pair of angle brackets 74 are also secured to the crossbars 64 and are disposed inwardly of the brackets 66 over the belts 32. A pair of rods 72 depend from the bracket 74 and are adjustably secured thereto by means of nuts threaded on the upper ends of the rods in the manner discussed with respect to the previously mentioned rods. A pair of guide rails 76 are secured to the lower ends of the rods 72 by means of welding or the like and the rails 76 are disposed in parallel relationship with respect to the rails 62. The ends of the rails 76 at the point where they overlap the belts 44 are bent so that the rails extend parallel to the edges of the belts 44.

A third pair of crossbars 84 are secured to the stringer bars 50 and extend toward each other where they are secured together by means of the angle bracket 82. A pair of rods 80 are adjustably secured to the angle bracket 82 in the manner in which the other rods were adjustably secured and depend downwardly therefrom. The rods 80 at their lower ends are secured to support rails 79 which in turn are secured to a V-shaped guide rail 78. The apex of the V-shaped guide rail 78 is substantially centered with respect to the main conveyer belt. Also secured to the crossbars 84 are a pair of angle brackets 86 to which are adjustably secured a pair of depending rod members 88. The lower end of the rods 88 are secured to the ends of the guide rails 76 at the point where they extend parallel to the belts 44.

Disposed adjacent to the belts 44 are a pair of release gate assemblies designated generally at 90 and a pair of testing stations generally designated as 92. The details of the release gate assembly and the testing station will be set forth hereinafter in greater detail.

As the containers are conveyed along the belts 44 past the release gate assembly, they are guided between a guide rod 94 and a guide plate 95 which are disposed parallel to each other on opposite sides of the belt 44. The rods 94 are adjustably secured to a pair of slotted vertical supports 96 which in turn are secured to the side plate 26 (FIGURE 2). The guide plates 95 are adjustably secured to a slotted vertical support 99 which in turn is adjustably secured to the main frame 22. Thus, it is seen that the guide rods 94 and guide plates 95 may be moved closer and further away from each other and may be moved up and down to the desired position depending upon the size of the containers passing therebetween. As the containers pass the testing station, they are guided by means of guide rods 98 adjustably secured to a slotted vertical support member 100 which in turn is secured to the side plate 26.

Mounted adjacent each release gate assembly on the input side thereof is photocell 102 adapted to receive light from light source 103 mounted on the opposite side of the conveyer belt 44. A second photocell 104 is mounted adjacent each testing station 92 on the input side thereof and they are adapted to receive light from source 103 mounted on the opposite side of the conveyer belts 44.

Mounted adjacent to the output end of the auxiliary conveyer system are a plurality of guide rails somewhat similar to the guide rails previously described with respect to the input end of the inspection apparatus. Two pairs of uprights 106 and 108 are secured to the side plates 26 and 28. A pair of stringer bars 110 are secured to the uppermost ends of the uprights. A plurality of pairs of crossbars 112, 114 and 116 are secured at their ends to the stringer bars 110 and extend toward each other where they are secured together by means of angle brackets 118, 120 and 122, respectively. A pair of rods 124 are adjustably secured to a pair of brackets 123 which in turn are secured to the crossbars 112. The lower ends of the rods 124 are secured to guide rails 134 which extend in opposed parallel relationship to the guide rods 98. The second pair of rods 125 are adjustably secured to the bracket 118 and depend downwardly to a point at which they are secured to the support rails 127 which in turn are secured to the V-shaped guide rail 135. Another pair of guide rails 136 which are suspended above and in close proximity to the belts 34 are secured to and supported by two pairs of rods 126 and 128 which in turn are adjustably secured to brackets mounted on the crossbars 112 and 114. Another pair of rods 132 are adjustably secured to brackets 133 which in turn are secured to crossbars 114. The lower ends of the rods 132 are secured to the guide rails 138 which extend parallel to each other at the point of attachment to the rods 132 and which diverge from each other in parallel relationship to the faces of the V-shaped guide rail 135. Another pair of rods 130 are adjustably secured to brackets 131 which in turn are secured to the crossbars 114. The rods 130 depend downwardly from the brackets 131 and are secured to the ends of guide rails 138 and guide rails 140. The guide rails 140 curve outwardly away from the conveyer belts 44 and surround the periphery of reject platforms 142 which are secured to the main frame 22.

A gate member 144 is provided which in its normal position, as illustrated in FIGURE 1, will guide the containers from the belt 44 onto the belt 34 from which they will in turn be guided onto the main conveyer 30. If the gate member 144 is pivoted, such that the end of the gate 144 is adjacent the end of the guide rail 134, the containers will be diverted onto the reject platform by means of the guide rail 140. A pair of support plates 148 are secured to the stringer bars 110 and the crossbars 114. A vertically extending shaft 146 is journaled through the plate 148 at its upper end with the lower end of the shaft being secured to the gate 144. A hydraulic or pneumatic cylinder 152 is pivotally secured to a support member 151 which is adjustably secured to a side plate 150. The cylinder 152 has a piston therein mounted for reciprocating movement and connected to the piston rod 154 which in turn is pivotally connected to the link 156 secured to the shaft 146. Therefore, it is seen that when the piston rod 154 is in its retracted position the gate 144 will be disposed in the position shown in FIGURE 1 and when the piston rod 154 is extended, the gate 144 will be pivoted to a position adjacent the guide rail 134.

Therefore, with respect to the operation of the conveying mechanism, it is seen that the containers will be moved along the belt 30 from left to right as viewed in FIGURE 1. As the containers enter between the guard rail 62, some of the containers will be diverted onto one of the belts 32, whereas other containers will be diverted onto the other belt 32. The belts 32 will convey the containers between the parallel guide rails onto the belts 44 which in turn will convey the containers past the release gate assembly and the testing station. If the fluid cylinder 152 has been actuated, the gate 144 will be disposed in such a manner that the containers will be conveyed by the belt 44 along the guide rails 140 onto the reject platform 142 adjacent the belts 44. If the gate 144 is disposed as shown in FIGURE 1, the containers will be moved along the surface of the gate 144 by means of the belts 44 onto the belts 34. The belts 34 will then transport the containers between the guide rails 135 and 138 onto the main conveyer belt 30, whereupon the containers will be moved to subsequent handling stations.

Figure 3:
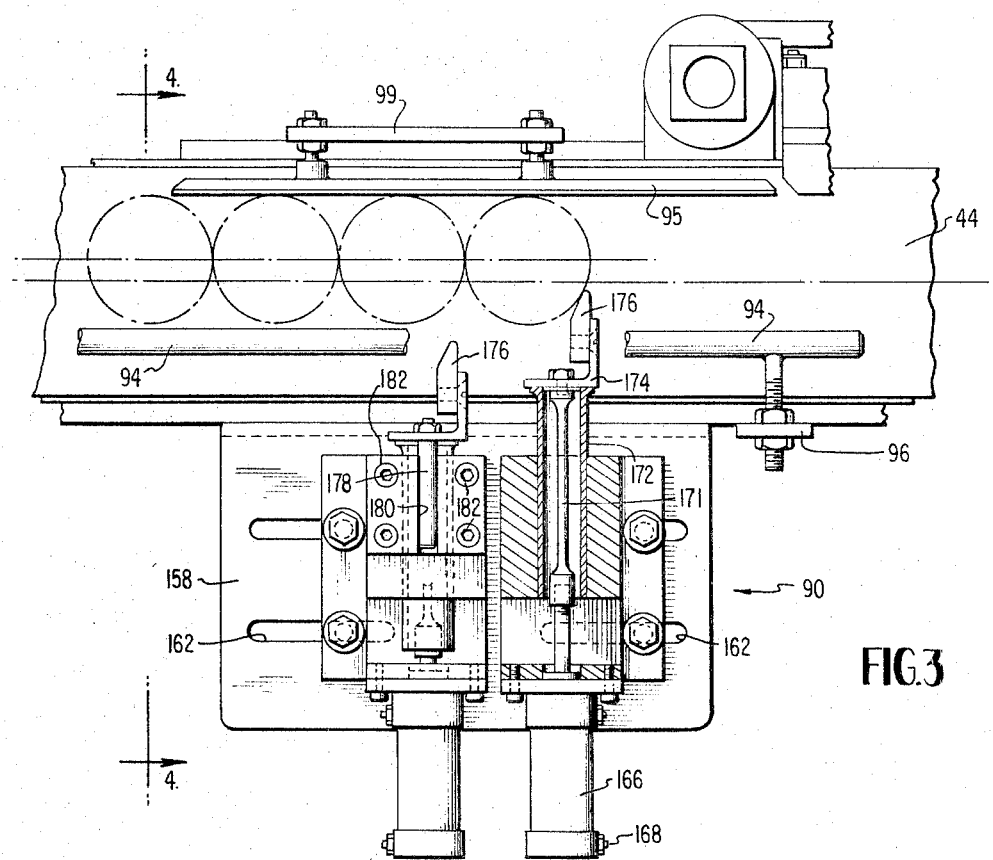
FIGURE 3 is a detailed plan view, partly in section, of the release gate subassembly.
Figure 4:
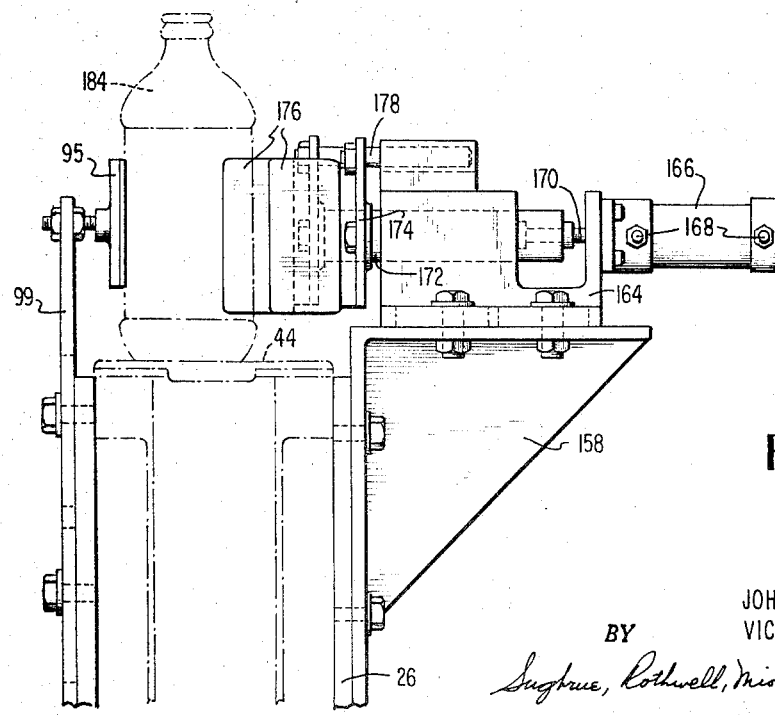
FIGURE 4 is a sectional view taken along the line 4—4 in FIGURE 3.
Figure 6:
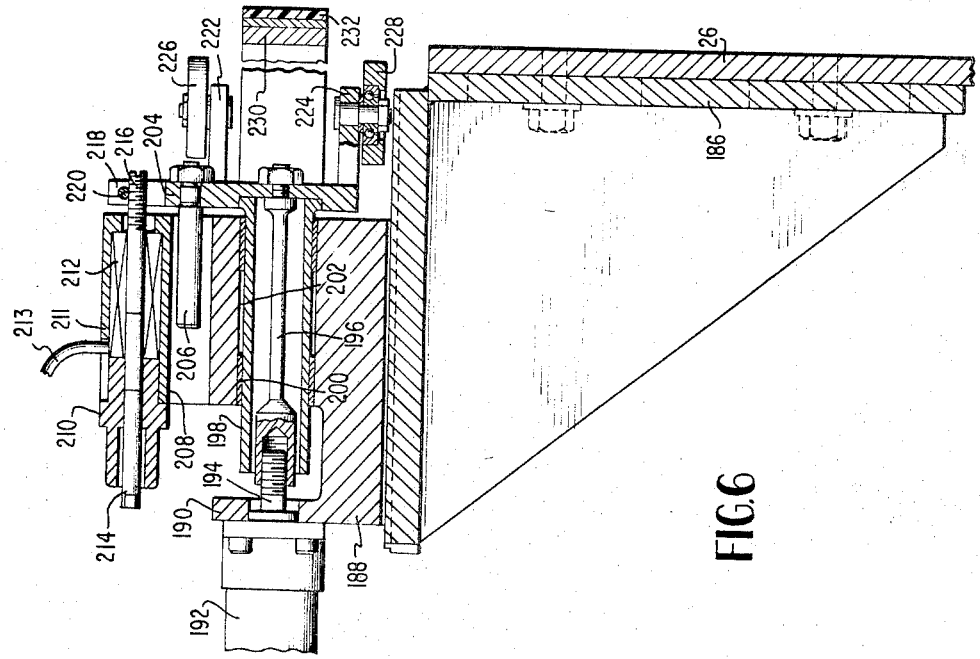
FIGURE 6 is a sectional view taken along the line 6—6 in FIGURE 5.
Figure 5:
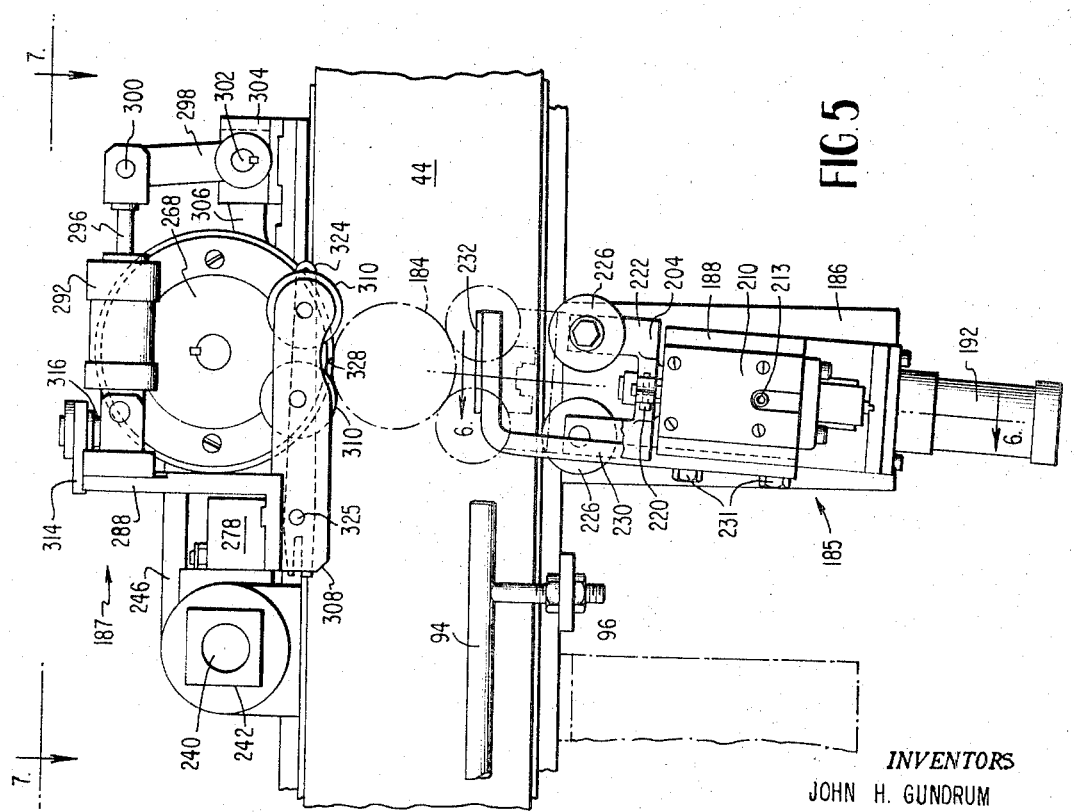
FIGURE 5 is a detailed top plan view of the inspection station.

Turning now to the detailed description of the release gate assembly, attention is directed to FIGURES 3 and 4.

An L-shaped support bracket 158 is adjustably secured to the side plate 26 by means of nut and bolt connections extending through elongated slots 160 in the vertical surface of the support bracket 158. The upper or horizontal surface of the support bracket 158 is provided with longitudinal slots 162. The pair of frame members 164 are adjustably secured to the support bracket 158 by means of nut and bolt connections extending through the slot 162. Since both assemblies secured to the frames 164 are substantially identical, the same reference numerals will be utilized to describe the parts of both the assemblies. The frame 164 is provided with an upright flange to which the fluid cylinder 166 is secured. The cylinder 166 is provided with speed adjustments 168. The piston rod 170 is secured to a piston (not shown) which reciprocates back and forth within the bore of cylinder 166. The other end of the piston rod is secured to a connecting rod 171 which in turn is secured to a concentric guide sleeve 172 by means of an L-shaped head 174. The container contacting finger or plate 176 is mounted on the outer extremity of the L-shaped head 174. Also mounted on the head 174 is a guide rod 178 adapted to reciprocate within a slot 180 formed between two guide blocks 182 secured to the upper surface of the frame 164. In this manner the container contacting finger 176 is prevented from rotating about the axis of the sleeve 172.

In operation, the fingers 176 are normally disposed in the position shown in FIGURE 3 with the right-hand finger in blocking relationship with respect to the path of travel of the containers between the guide rails 94 and 95. As previously pointed out, the photocell 102 is mounted adjacent the input side of the release gate assembly. When a sufficient number of containers build up against the left-hand finger 176 as viewed in FIGURE 3, the light beam from the source 103 to the photocell 102 will be blocked thereby causing actuation of the left-hand finger to its extended position. Subsequently thereto the right-hand finger 176 will be retracted to allow the container which was disposed between the two fingers to be conveyed past the release gate assembly by means of the conveyer belt 44. The conveyer belt 44 is continuously operating and those containers which are blocked by the left-hand finger 176 will merely slide with respect to the belt 44. The electrical and fluid circuitry necessary to perform the aforementioned operation may be in any desired form. For example, upon breaking the light beam to the photocell 102, a relay might be permitted to drop out which will close a switch to an electrically operated valve thereby admitting fluid to the cylinder 166 to cause the extension of the left-hand finger 176 into the path of the containers. Limit stop switches could be mounted in conjunction with the guide rods 178 which would be closed upon the complete extension of the left-hand finger 176. This in turn would cause the admission of fluid to the right-hand cylinder 166 to retract the right-hand finger 176. A suitable and adjustable delay could be incorporated to enable the right-hand finger to return to its fully extended position before the left-hand finger is fully retracted.

Turning now to a detailed description of the test station 92, attention is directed to FIGURES 5 through 10 which show the various aspects of the testing station in greater detail.

The testing station 92 is comprised of pressure means 185 and spinning means 187 located on opposite sides of the conveyor belt 44. The pressure means 185 is comprised of an L-shaped support bracket 186 secured to the side plate 26 in an adjustable manner. On the upper horizontal surface of the support bracket 186 a housing 188 is mounted which is provided with an upstanding flange 190. A fluid cylinder 192 is secured to the flange 190 and has a reciprocating piston rod 194 protruding therefrom through an opening in the flange 190. The connecting rod 196 is secured to the piston rod 194 at one end thereof with the opposite end secured to a head plate 204.

Concentric with the connecting rod 196 is a hollow guide sleeve 198 reciprocable in bore 202 on bearings 200. The sleeve 198 is secured at one end to the head member 204. A guide rod 206 is secured to the head plate 204 and reciprocates within a guide slot 208 formed in the upper portion of the housing 188 to prevent the head member 204 from rotating about the axis of the sleeve 198. A transformer housing 210 is secured to the upper surface of the housing 188 by screws or the like and is formed with elongated bore 211 extending therethrough parallel to the sleeve 198. A coil 212 having a lead 213 is disposed within the bore 211. A core 214 is mounted for reciprocating movement within the bore 211 and is concentric with the coil 212. One end of the core 214 is threaded at 216 and is threadedly disposed in a slot 218, the sides of which are drawn together in clamping relation upon the end 216 of the core by means of a screw member 220. A pair of horizontally disposed U-shaped brackets 222 and 224 are secured to the face of the head plate 204 adjacent the conveyor belt 44. A pair of rollers 226 are mounted on the bracket 222 for rotation in a horizontal plane. Likewise, a pair of rollers 228 are mounted on the lower bracket 224 for rotation in a horizontal plane. The axes of the rollers 226 are vertically aligned with the axes of the rollers 228.

An L-shaped brake arm 230 is secured to the side of the housing 188 by means of bolts 231. The outermost end of the brake arm 230 is disposed in parallel relationship to the head plate 204 and is provided on its outermost surface with a high friction coating 232. On the opposite side of the conveyor belt 44 a spinner mechanism 187 is located in such a position so as to cooperate with the presser assembly 185 to rotate the bottle held therebetween on its own axis. The spinner assembly 187 (see FIGURE 5 and FIGURE 7) is comprised of a support plate 234 which is adjustably mounted on the main frame of the inspection device by means of nuts and bolts extending through the elongated adjustment slots 236 in the plate 234. The plate 234 has a pair of bosses 238 extending outwardly from the surface thereof and provided with aligned bore means for the reception of a support pin 240 which is adapted to extend therethrough. The pin 240 is supported in operative relationship with respect to the bosses by means of a nut 242 threaded on the upper end thereof. A spinner carrier 244 is comprised of an elongated tube member having a pair of support arms 246 secured thereto and extending upwardly away from the tubular structure in parallel relationship to each other. The free ends of the support arms 246 are provided with aligned bores through which the pin 240 is adapted to pass. The pin 240 is provided with a thrust bearing 241 which is disposed beneath the uppermost arm 246 to support the spinner carrier relative to boss 280. The tubular portion of the spinner carrier is provided with a bore 248 extending lengthwise thereof and which is adapted to receive a shaft 250 which is rotatably journaled in the ends of the tube means of bearings 252. A motor support 254 is secured to the lowermost end of the pin 240 by means of the clamp bracket 256. The guide pin 258 is secured to the clamp plate 256 and extends upwardly therefrom into a bore 259 in the support 234 to prevent the motor support 254 from rotating about the pin 240. An electric motor 260 is secured to the motor support 254 and depends downwardly therefrom. The motor is provided with a shaft 262 having a gear 264 secured thereto. The gear 264 is enmeshed with a gear 266 secured to the lowermost end of the shaft 250 below the spinner carrier 244. The gearing may be enclosed in a gear housing 267 shown in dash lines in FIGURE 7.

Spinner carrier assembly 244 can rotate about pin 240 a limited amount to provide a spring-loaded yielding contact with ware being rotated and inspected.

On the uppermost end of the shaft 250 the spinner wheel 268 is secured by means of a spline 270 and set screws 272. The spinner wheel is comprised of a hub member and two circular discs secured to either end of the hub member and disposed in parallel relationship with respect to each other. An annular tire member 274 is disposed about the periphery of each disc of the spinner wheel and may be of rubber or any other suitable composition. The tires 274 are secured on the disc by means of retaining rings 276 which are secured to the spinner wheel by means of screws. Thus, it is possible to quickly and easily replace the tire members when they become worn.

A support bracket 278 is provided with a boss 280 having a hole therethrough for the reception of the pin 240. The boss is disposed between the two support arms 246 for the spinner carrier 244. The boss 280 may be secured relative to the pin 240 by means of set screws or pins or the like. The spring bracket 282 is secured to the lower end of the support 278 and extends in the opposite direction from the boss 280. The spinner carrier 244 is provided with a projection 284 and a spring 286 is secured at one end of the projection 284 and the opposite end to the spring plate 282.

At the upper end of the support 278 an L-shaped bracket 288 is secured to the face of the support adjacent the conveyer 44 and extends rearwardly away from the conveyer 44. An actuator support is secured to the side face of the bracket 288 and the fluid cylinder 292 is pivotally secured thereto at pivot 294. A piston rod 296 extends outwardly from the opposite end of the fluid cylinder 292 and is pivotally connected to the link 298 at 300. The link 298 is secured to a stop shaft 302 which is journaled for movement within the support 304 secured to the main support member 234. Also secured to the stop shaft 302 is the brake arm 306 which is comprised of a pair of parallel extending arms 307 which are adapted to be provided with high friction faces similar to the high friction face shown on the surface of the station area brake arm 230.

A pair of idler wheel support plates 308 are secured to the support 278 in parallel spaced relationship. The uppermost plate 308 is provided with a pair of downwardly depending idler wheels 310 which are rotatable in a horizontal plane. A second pair of idler rollers 312 are rotatably mounted on the upper surface of the lower support plate 308 and are also arranged for rotation in a horizontal plane parallel to the horizontal plane of the rollers 310. Rollers 310 and 312 are located on two common vertical axes.

A transformer support plate 314 is secured to the L-shaped support bracket 288. The differential transformer housing 316 is secured to the support plate 314 and is provided with a central bore having a coil 318 therein, having an electrical lead 320 as shown in FIGURE 9. A reciprocating core 322 is mounted for axial sliding movement within the housing and disposed in concentric relationship with respect to the coil 318. The end of the core 322 which protrudes from the transformer housing 316 is pivotally connected to a detector arm 324 at pivot point 326. A container feeler head 328 is secured to the arm 324 and is adapted to be biased into engagement with a container by means of a spring 323 disposed between the arm 324 and the transformer housing 316. The arm 324 is pivoted to the support 278 about pin 325. The end of the arm 324 on the opposite side of the pivot 325 from the feeler head 328 is disposed in abutting relationship to a stop pin 330 which is adjustably secured in a bore in support 278.

The brake arms 307 extend between the parallel plate portions of the spinner wheel and the arm 324 is disposed between the arms 307.

In the operation of the inspection apparatus, after a container has been released from the release gate assembly 90, the container will intercept the light beam to the photocell 204. With the cylinder 192 operating, the head member 204 is shifted upwardly as viewed in FIGURE 5 so as to shift the idler rollers 226 and 228 from the full line position in FIGURE 5 to the dash line position. As the rollers 226 and 228 move across the conveyer belt 44, they will contact the container 184 and shift the container into engagement with the fixed rollers 310 and 312. Thus, it is seen that the container 184 is securely but rotatably located between the four sets of rollers 226, 228, 310 and 312.

As the head member 204 is shifted outwardly away from the differential transformer 210, the core 214 which is secured to the head 204 is shifted within the coil 212 to provide a voltage output proportional to the linear displacement from a zero setting made with the aid of a gage cylinder used for set-up purposes. Thus, by means of the differential transformer 210, it is possible to determine whether the diameter of the container 184 is too small, too large, or within the acceptable limits. When the head 204 is completely retracted, that is, when it is moved to its extreme left-hand position as viewed in FIGURE 6, the edges of the rollers 226 and 228 will be retracted behind the friction coated surface 232 of the brake arm 230.

When a container is not present at the testing station, the spinner wheel 268 is normally biased ouwardly to approximately the tangential plane touching the surfaces of the rollers 310 and 312. When a container 184 is gripped between the four pairs of rollers upon actuation of the presser means, the spinner wheel 268 will be biased slightly inwardly against the force of the spring 286. This spring force will tend to keep the spinner wheel firmly against the surface of the container and with rotation of the spinner wheel the container will be rotated about its axis at a predtermined speed.

The sensor arm 324 with the feeler member 328 thereon is biased outwardly between the rollers 310 and 312 by means of the spring 323. When a container is gripped between the four sets of rollers, the arm 324 compresses the spring 323 so as to provide a constant biasing force to hold the feeler 328 against the surface of the container. As the container is being rotated, the feeler members 328 will contact the peripheral surface of the container to determine if the container is out of round or if there are any flat spots, surface pits, indentations or ruptures. If the container is within the acceptable dimensions and free of any serious defects, the movement of the arm 324 will be so slight that the movement of the core 322 within the coil 318 will be relatively negligible and no significant change in the transformer voltage will occur. Sensor 328 is also zero adjusted with a gage cylinder in place by means of adjusting knob K (FIGURE 9). However, if the arm 324 moves a greater or predetermined amount due to a defect with respect to the dimensions and surface of the bottle 184, the movement of the core 322 will be sensed by the transformer and communicated to a control center to indicate the presence of a defective article and to effect the actuation of reject mechanisms previously mentioned.

When the entire periphery of the container 184 has been traced by the sensor member 328, the presser assembly 185 is actuated to withdraw the rollers 226 and 228. As soon as the presser starts to withdraw, it is desirable to brake the rotation of the article which has been tested. Therefore, the pivotal brake arm 306 with the friction coated arms 307 is pivoted into contact with the container 184 by actuation of the cylinder 292. The brake arm continues to contact the article throughout a predetermined timing period until the article is pressed against the stationary brake arm 230 which is located on the presser side of the conveyer. As soon as a rotation of the article is terminated, the pivotable brake arm is withdrawn from contact with the container, thereby allowing the container to be carried by the constantly moving conveyer toward the deflector arm 144. The deflector arm 144 is controlled by the master control and if the master control has received a signal from either transformer 210 or 316 which indicates a defective article, the cylinder 152 will be energized to swing the gate 144 to the position adjacent the guide rail 134. In this position, the containers will be carried by the belt 144 against the rail 140 which will guide the defective containers onto the reject platform 142. If the master control has not received the signal indicative of a defective container the gate 144 will remain in the position illustrated in FIGURE 1 and the acceptable containers will be transported by the belts 44, 34 and 30 to a subsequent processing station.

Obviously, many modifications and variations of the present invention are possible in the light of the above teachings. It is, therefore, to be understood that within the scope of the appended claims the invention may be practiced otherwise than as specifically described.

What is claimed is:

1. Inspection apparatus adapted to be mounted adjacent a conveyer belt for inspecting substantially cylindrical articles as they are transported by said belt comprising movable presser means adapted to be located on one side of said belt, a yielding spinner means adapted to be located on the other side of said belt opposite said presser means and adapted to rotate one of said articles in place about its own axis upon movement of said presser means to shift an article into operative engagement with said spinner means, sensing means associated with said presser means and said spinner means to sense dimensional and surface characteristics of said article, and brake means adapted to be moved into engagement with said article upon release of said article by said presser means to stop rotation of said article.

2. Inspection apparatus according to claim 1 wherein said sensing means comprises a differential transformer means having a movable core secured to said movable presser means whereby the distance traveled by said presser means will appear as a corresponding voltage change in said transformer means to indicate the diameter of said article and adjusting means whereby different size cylindrical articles may be inspected by simple readjustment of the various components comprising the inspection device.

3. Inspection apparatus according to claim 1 wherein said sensing means comprises a pivoted sensor arm adapted to bear against the periphery of said article while said article is rotated by said spinner means, differential transformer means having a core movable therein and secured to said pivoted sensor arm whereby excessive movement of said arm due to defects in said article will be transmitted to said core to vary the voltage of said transformer.

4. Inspection apparatus according to claim 1 wherein said movable presser means is comprised of a frame, reciprocating fluid cylinder or motor means secured to said frame, movable bracket means mounted for reciprocating movement in said frame and connected to said cylinder means, a plurality of rollers journaled in said bracket for rotation about two spaced vertical axes and adapted to contact the periphery of said article, photo-sensing means located upstream of said pressure means adjacent said conveyor adapted to initiate article engagement and movement of said presser means.

5. Inspection apparatus according to claim 1 wherein said brake means comprise a stationary brake member secured to said presser means and normally disposed closer to said spinner means than said presser means and a movable brake member pivotally secured to said spinner means and adapted to be pivoted into engagement with said one article upon retraction of said presser means to grip said one article between said stationary brake member and said movable brake member to stop rotation of said one article.

6. A conveying, inspecting and sorting arrangement comprising endless main conveyer means, auxiliary endless conveyor means mounted in spaced parallel relation to said main conveyer means, first and second endless transfer conveyer means disposed parallel to and intermediate said main and auxiliary conveyer means, said first transfer conveyer means being disposed adjacent one end of said auxiliary conveyer means and said second transfer conveyer means being disposed adjacent the other end of said auxiliary conveyer means, guide means for guiding a plurality of articles in single file along said main conveyer means, diagonally across said first transfer conveyer means and along said auxiliary conveyer means, inspecting means mounted adjacent said auxiliary conveyer means intermediate the ends thereof, additional guide means for guiding said articles in single file diagonally across said second transfer conveyer means from said auxiliary conveyer means to said main conveyer means, gate means normally disposed diagonally across said auxiliary conveyer means adjacent said additional guide to transfer acceptable articles from said auxiliary conveyer means onto said second transfer conveyer means, said gate means being movable in response to the detection of a faulty article by said inspecting means to a position allowing said faulty article to continue on said auxiliary conveyer means past said additional guide means for subsequent rejection.

7. A conveying, inspecting and sorting arrangement as set forth in claim 6 wherein identical conveying, guiding, inspecting and sorting means are located on opposite sides of said main conveyer means.

References Cited

UNITED STATES PATENTS

| | | | |
|---|---|---|---|
| 2,542,090 | 2/1951 | Lorenz | 209—73 X |
| 2,771,177 | 11/1956 | Cutter et al. | 198—34 |
| 3,101,848 | 8/1963 | Uhlig | 209—111.7 |
| 3,245,533 | 4/1966 | Rottmann | 209—111.7 |

FOREIGN PATENTS

| | | |
|---|---|---|
| 950,786 | 2/1964 | Great Britain. |

ALLEN N. KNOWLES, *Primary Examiner.*